United States Patent
Friberg et al.

(10) Patent No.: US 7,401,425 B2
(45) Date of Patent: Jul. 22, 2008

(54) SNOWTHROWER WHEEL DRIVE STEERING SYSTEM

(75) Inventors: Nathan J. Friberg, Bloomington, MN (US); Donald M. White, III, Chanhassen, MN (US)

(73) Assignee: The Toro Company, Bloomington, MN (US)

( * ) Notice: Subject to any disclaimer, the term of this patent is extended or adjusted under 35 U.S.C. 154(b) by 267 days.

(21) Appl. No.: 11/021,480

(22) Filed: Dec. 23, 2004

(65) Prior Publication Data

US 2006/0150444 A1 Jul. 13, 2006

(51) Int. Cl.
*B62D 11/02* (2006.01)

(52) U.S. Cl. .............................. 37/241; 37/196; 180/6.2; 192/20; 192/49

(58) Field of Classification Search .................... 37/196, 37/240, 241, 257; 180/6.2, 19.3; 56/11.5, 56/11.7; 192/20, 49, 69.3, 71
See application file for complete search history.

(56) References Cited

U.S. PATENT DOCUMENTS

| 2,143,121 | A | * | 1/1939 | Cox | 192/43.1 |
| 4,328,877 | A | * | 5/1982 | Ballard | 180/338 |
| 5,018,592 | A | | 5/1991 | Buchdrucker | |
| 6,578,292 | B2 | * | 6/2003 | Dowe et al. | 37/257 |
| 6,662,477 | B2 | * | 12/2003 | Dowe et al. | 37/257 |
| 6,681,909 | B2 | * | 1/2004 | Cox | 192/26 |
| 6,942,082 | B1 | * | 9/2005 | Bunnow et al. | 192/49 |

OTHER PUBLICATIONS

Toro 826 & 1032 Parts Catalog, 1977, pp. 1, 3, 4 & 7.

* cited by examiner

*Primary Examiner*—Gary S Hartmann
(74) *Attorney, Agent, or Firm*—James W. Miller

(57) ABSTRACT

A snowthrower has independent wheel drive trains to allow steering by clutching one drive train while unclutching the other drive train. The clutch in each drive train comprises a plurality of pivotal pawls carried on a drive member with the pawls pivoting in a plane that is substantially perpendicular to the rotational axis of the drive member. The pawls have heads that project through one face of the drive member and tails located on an opposite face of the drive member. The heads of the pawls can engage or disengage notches that are fixed to the driven member to clutch or unclutch the drive and driven members. A shift member axially presses on the tails of the pawls to disengage the heads of the pawls from the driven member. The shift member is selectively moved by an operator using a steering lever on the snowthrower.

29 Claims, 12 Drawing Sheets

SNOWTHROWER WHEEL DRIVE STEERING SYSTEM

TECHNICAL FIELD

This invention relates to a snowthrower having a pair of drive wheels for propelling the snowthrower over the ground. More particularly, this invention relates to a steering system for steering the snowthrower by selectively disengaging the drive wheel on one side of the snowthrower while engaging the drive wheel on the other side of the snowthrower.

BACKGROUND OF THE INVENTION

Snowthrowers are known having a pair of drive wheels for propelling the snowthrower over the ground. One drive wheel is carried on each side of the snowthrower. Typically, the rotational speed of the drive wheels can be adjusted by the operator using a speed control lever to adjust the ground speed of the snowthrower. In addition, a separate engagement control lever is provided for the operator to selectively engage and disengage the drive wheels. However, once the operator has selected a particular speed for the wheels using the speed control lever and has engaged the wheels using the engagement control lever, the wheels continuously rotate at the same speed.

Many such prior art snowthrowers cannot be steered by the operator other than by pushing or pulling on the handles of the snowthrower while the drive wheels are rotating. For example, to effect a turn to the left, the operator would typically push on the handles to turn the front of the snowthrower to the left. This can be physically demanding for some operators particularly in the snowy conditions in which snowthrowers are used. In addition, the steering provided by such a method typically results in jerky turning motions of the snowthrower to one side or the other. It is thus somewhat difficult to precisely steer the typical snowthrower having a pair of continuously rotating drive wheels.

Some prior art snowthrowers incorporate a steering system that permits the snowthrower to be more easily steered. For example, in some snowthrowers, the drive wheels are driven through a differential. The differential automatically reduces the speed of the drive wheel on the inside of a turn and automatically increases the speed of the drive wheel on the outside of a turn. Thus, while the operator still steers the snowthrower by pushing on the handles, the differential facilitates the turn and allows more precise directional control.

Unfortunately, differentials are relatively expensive and unduly increase the cost of the snowthrower. In addition, when one drive wheel driven by a differential spins or loses traction, the differential automatically transfers torque to the spinning drive wheel from the non-spinning drive wheel. Snowthrowers often operate on icy or snowy surfaces where one drive wheel might hit a patch of ice or snow and lose traction compared to the other drive wheel which retains traction. In this case, the snowthrower loses all traction since the differential transfers all the torque to the spinning drive wheel. As a result, a differential equipped snowthrower is not an effective way in a practical sense to steer a snowthrower.

U.S. Pat. No. 5,018,592 discloses another way to steer a snowthrower. In the 592 patent, each drive wheel is independently driven by a planetary gear transmission. A steering lever provided on each handle is coupled to the planetary gear transmission on the same side of the snowthrower. When the steering lever on one handle is manipulated by the operator, a pawl is removed from engagement with a ring gear to allow the ring gear to rotate and thereby place the planetary gear transmission on that side of the snowthrower into an inoperative, non-driving condition. This effectively unclutches the drive wheel on the inside of the turn to effect a skid type turn, i.e. the drive wheel on the inside of the turn is not powered while the drive wheel on the outside of the turn remains powered.

While the steering system shown in the 592 patent is effective for steering a snowthrower, a planetary gear transmission is relatively complex. In addition to the ring gear, the planetary gear transmission requires a sun gear and a plurality of planet gears between the sun gear and the ring gear. Thus, a durable, simple and less expensive system for steering a snowthrower is desirable.

SUMMARY OF THE INVENTION

One aspect of this invention relates to an improved snowthrower which is propelled by a pair of ground engaging drive members comprising a left ground engaging drive member and a right ground engaging drive member powered by a power source. The snowthrower has an upwardly and rearwardly extending handle assembly to allow a walking operator to guide and control the snowthrower. The improvement relates to a steering system for the snowthrower which comprises independent left and right drive trains for independently driving the left and right ground engaging drive members, respectively, from the power source. Each drive train comprises a drive member, a driven member, and a clutch having at least one pivotal pawl with the clutch configured to transmit torque from the drive member to the driven member directly through the pawl to transfer a driving force to one of the ground engaging drive members. Left and right steering controls carried on the handle assembly of the snowthrower are connected, respectively, to the clutches in the left and right drive trains to selectively disengage a ground engaging drive member on one side of the snowthrower to steer the snowthrower toward the one side of the snowthrower having the disengaged ground engaging drive member.

Another aspect of this invention relates to a snowthrower which comprises a frame propelled by a pair of ground engaging drive members comprising a left ground engaging drive member and a right ground engaging drive member. A rotatable snowthrowing member is carried on the frame. A steering system is provided that includes a pair of clutches for independently driving the ground engaging drive members. Each clutch comprises a drive member that rotates about a rotational axis, a driven member, and at least one pawl carried on the drive member for operatively connecting the drive member to the driven member for rotation therewith in an engaged, drive position of the clutch. The pawl pivots on a pivot axis carried on the drive member.

Yet another aspect of this invention relates to a snowthrower of the type described in the preceding paragraph. Each clutch comprises a toothed drive member that rotates about a rotational axis and a toothed driven member that rotates about the rotational axis. A plurality of pivotal pawls are carried on the drive member. Each pawl has a head and a tail on opposite sides of a pivot for each pawl with the heads of the pawls projecting from one face of the drive member to move towards or away from the driven member for engagement and disengagement with the driven member, respectively. The tails of the pawls are disposed on an opposite face of the drive member. A shift member moves axially along the rotational axis towards the opposite face of the drive member to simultaneously press inwardly on the tails of the pawls to pivot all the pawls on the drive member. The shift member is under the selective control of an operator of the snowthrower.

Still another aspect of this invention relates to an improved snowthrower having independent drive trains. Each drive train includes a rotatable drive member, a rotatable driven member, and an independently operable clutch between the drive and driven members. Steering is accomplished by leaving one drive train engaged while unclutching the other drive train to disengage the other drive train with the snowthrower turning towards the disengaged drive train side. The clutch in each drive train comprises a plurality of pivotal pawls carried on the drive member. The pawls have heads that project from one face of the drive member. The heads of the pawls engage and disengage notches on the driven member to clutch or unclutch the drive and driven members, respectively.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
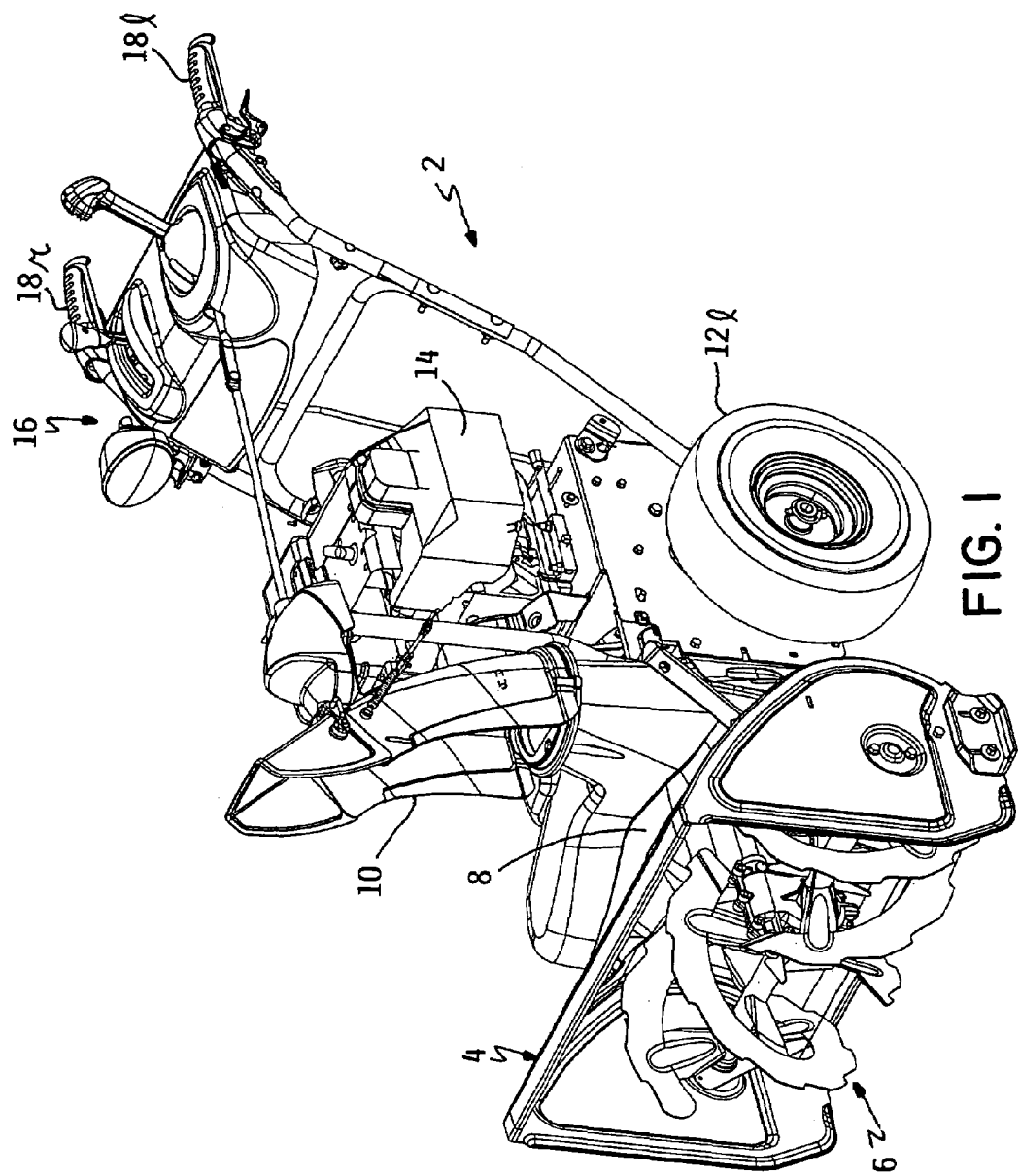
FIG. 1 is a perspective view of a snowthrower that incorporates the wheel drive steering system of this invention.

FIG. 1 illustrates a typical two stage snowthrower 2 having a snow collecting front auger housing 4 which contains a transverse snow collecting auger 6. The flights of auger 6 are oppositely directed to collect snow and move such snow inwardly towards the center of auger housing 4. The collected snow then passes through an opening in the rear wall of auger housing 4 into an impeller housing 8. Impeller housing 8 contains a high speed vaned blower or impeller (not shown) that throws the collected snow upwardly through a snow discharge chute 10.

Snowthrower 2 is supported for rolling over the ground by a pair of drive wheels 12 with one drive wheel being carried opposite each side of snowthrower 2. Only one drive wheel 12, i.e. the left drive wheel $12_l$, is shown in FIG. 1. An internal combustion engine 14 or other power source is carried on snowthrower 2 for powering drive wheels 12 as well as snow collecting auger 6 and the snow throwing impeller. A handle assembly 16 extends upwardly and rearwardly to allow an operator walking behind snowthrower 2 to guide and control snowthrower 2. Handle assembly has left and right handles $18_l$ and $18_r$, which the operator grips with the operator's left and right hands, respectively.

Figure 2:
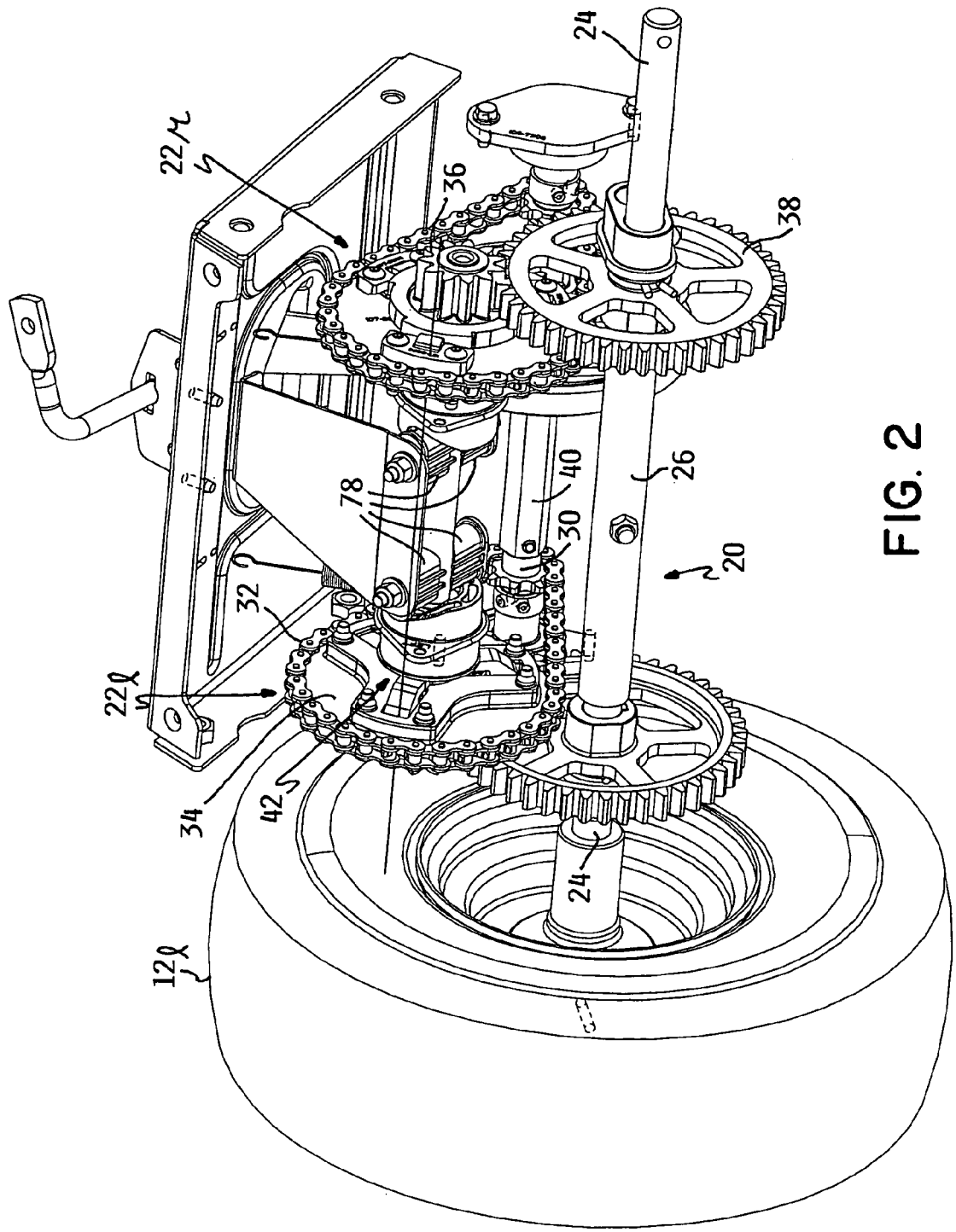
FIG. 2 is a perspective view of the underside of the snowthrower shown in FIG. 1, particularly illustrating the left and right drive trains, including the left and right wheel clutches, that form a portion of the wheel drive steering system of this invention.
Figure 12:
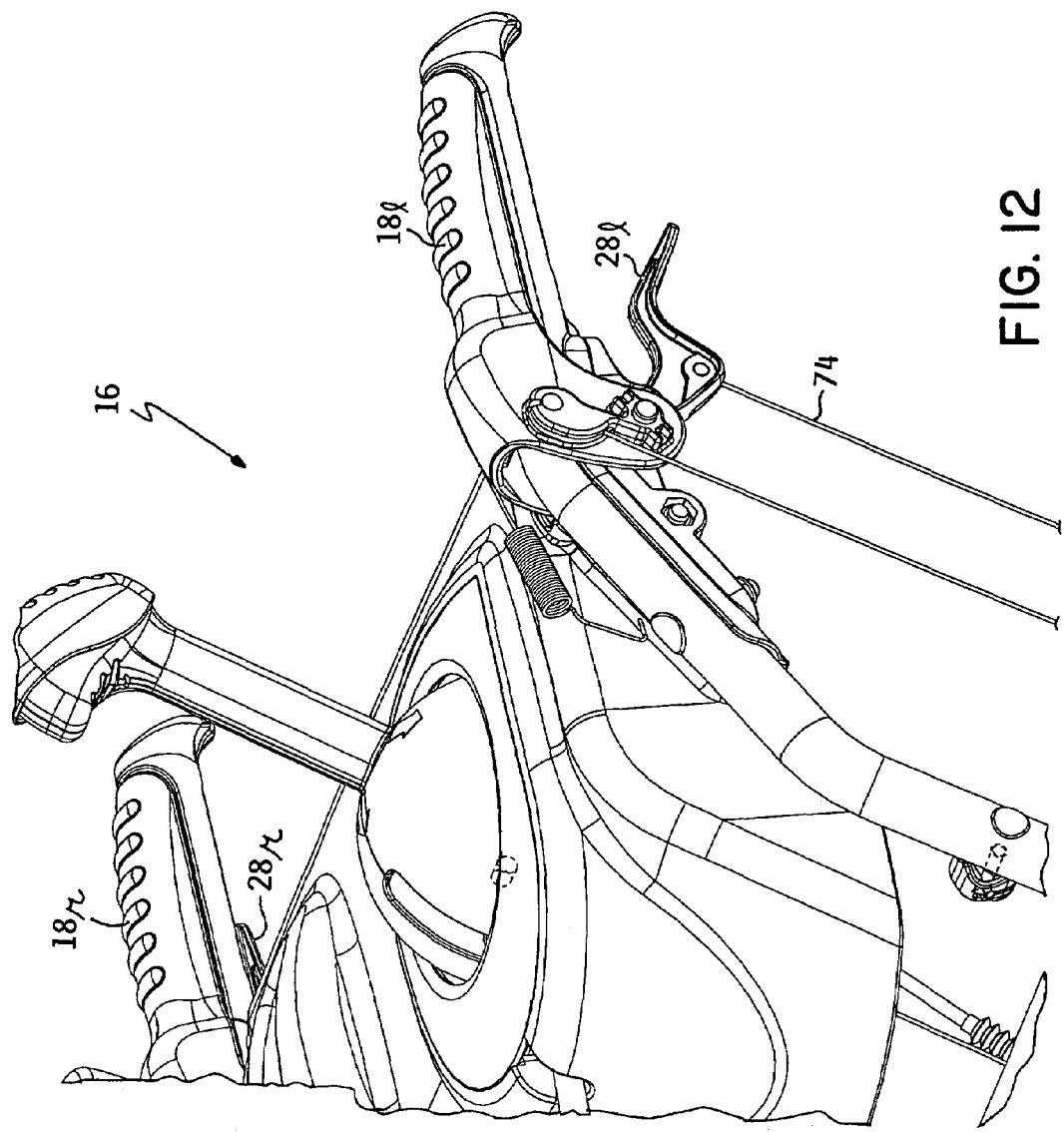
FIG. 12 is a perspective view of one of the handles of the snowthrower shown in FIG. 2, particularly illustrating the left and right steering levers that form another portion of the wheel drive steering system of this invention.

Referring now to FIG. 2, a wheel drive steering system according to this invention, illustrated generally as 20, comprises an independent left drive train $22_l$ and an independent right drive train $22_r$. Each drive train 22 transmits rotary torque to one of the drive wheels 12 for rotating drive wheels 12 to propel snowthrower 2. Each drive wheel 12 is mounted to the outer end of an outwardly extending stub shaft 24 that is rotatably journalled inside one end of an elongated mounting tube 26 that is part of the frame of snowthrower 2. In addition to the left and right drive trains 22, wheel drive steering system 20 includes left and right steering levers $28_l$ and $28_r$, which are pivotally carried on left and right handles $18_l$ and $18_r$, respectively. See FIG. 12.

The left and right drive trains $22_l$ and $22_r$ are identical to one another. Thus, a description of one drive train 22 will suffice to describe the other drive train.

Referring again to FIG. 2, each drive train 22 has four toothed members arranged in a pair of sprockets and a pair of gears with each pair of sprockets or gears comprising a small sprocket or gear driving a larger sprocket or gear, i.e. a sprocket or gear having a smaller diameter with fewer teeth driving a sprocket or gear having a larger diameter with a greater number of teeth. The first pair of sprockets comprises a small input sprocket 30 that is rotatably coupled by a chain 32 to a larger drive sprocket 34. The second pair of gears comprises a small driven gear 36 that is directly coupled to the teeth of a larger final output gear 38. The input sprocket 30 is carried on a continuously rotating input shaft 40 while each output gear 38 is carried on one of the stub shafts 24. The two pairs of toothed members, i.e. sprockets 32,34 and gears 36,38, provide two stages of speed reduction between the high rotational speed, low torque of input shaft 40 and the low rotational speed, high torque of stub shaft 24 on which a drive wheel 12 is carried.

A clutch 42 is part of each drive train 22 between drive sprocket 34 and driven gear 36. Steering system 20 includes a novel, durable and simple clutch 42 to drivingly interconnect drive sprocket 34 and driven gear 36.

Figure 3:
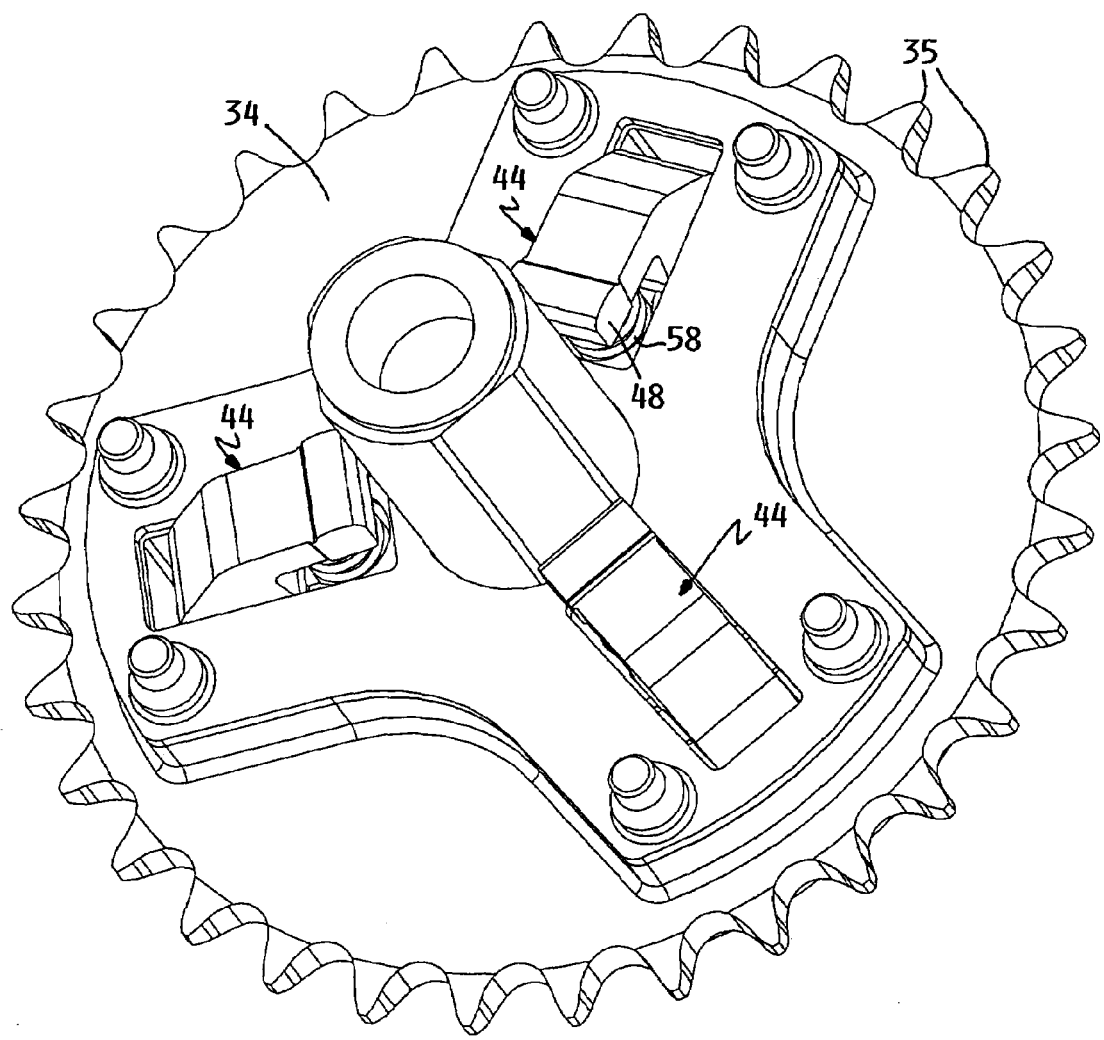
FIG. 3 is a perspective view of a portion of one of the wheel clutches shown in FIG. 2, particularly illustrating the drive sprocket from one side thereof with the drive sprocket carrying a plurality of pivotal drive pawls.
Figure 7:
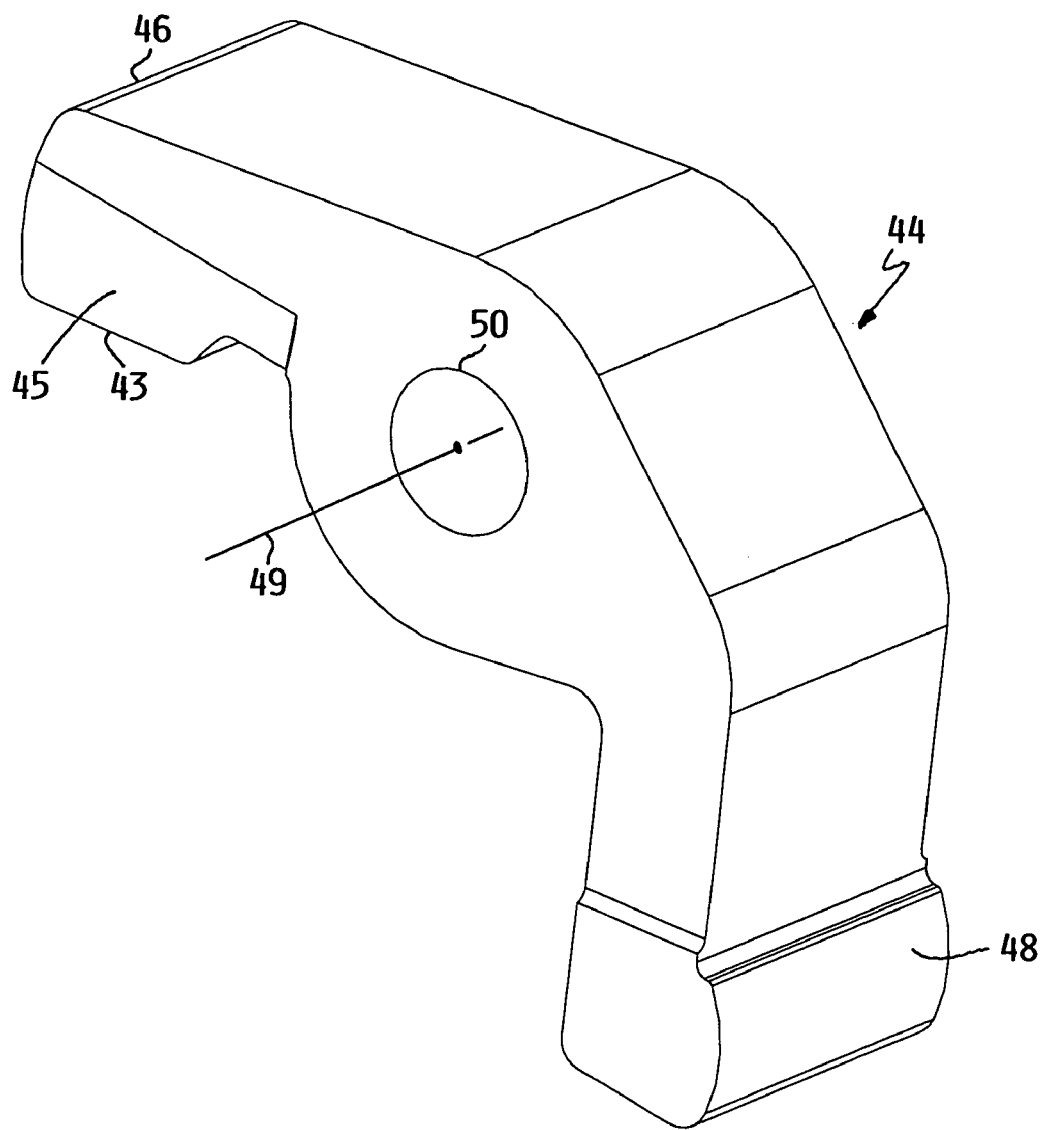
FIG. 7 is a perspective view of one of the drive pawls used on the drive sprocket shown in FIGS. 3-6.

As shown in FIG. 3, clutch 42 comprises a plurality of pivotal pawls 44 spaced circumferentially around drive sprocket 34 at equal angular distances from one another and radially inboard of the teeth 35 of drive sprocket 34. Preferably, there are three such pawls 44 spaced apart 120° from one another, but there could be fewer or greater numbers of pawls 44 if so desired. As shown in FIG. 7, each pawl 44 is shaped much like an L-shaped bellcrank lever with pawl 44 having a head 46 on one side of a pivot axis 49 and a tail 48 arranged at right angles to head 46 on the other side of pivot axis 49. Pivot axis 49 is defined by the axis of a bore 50 that extends through the thickness of pawl 44.

Figure 4:
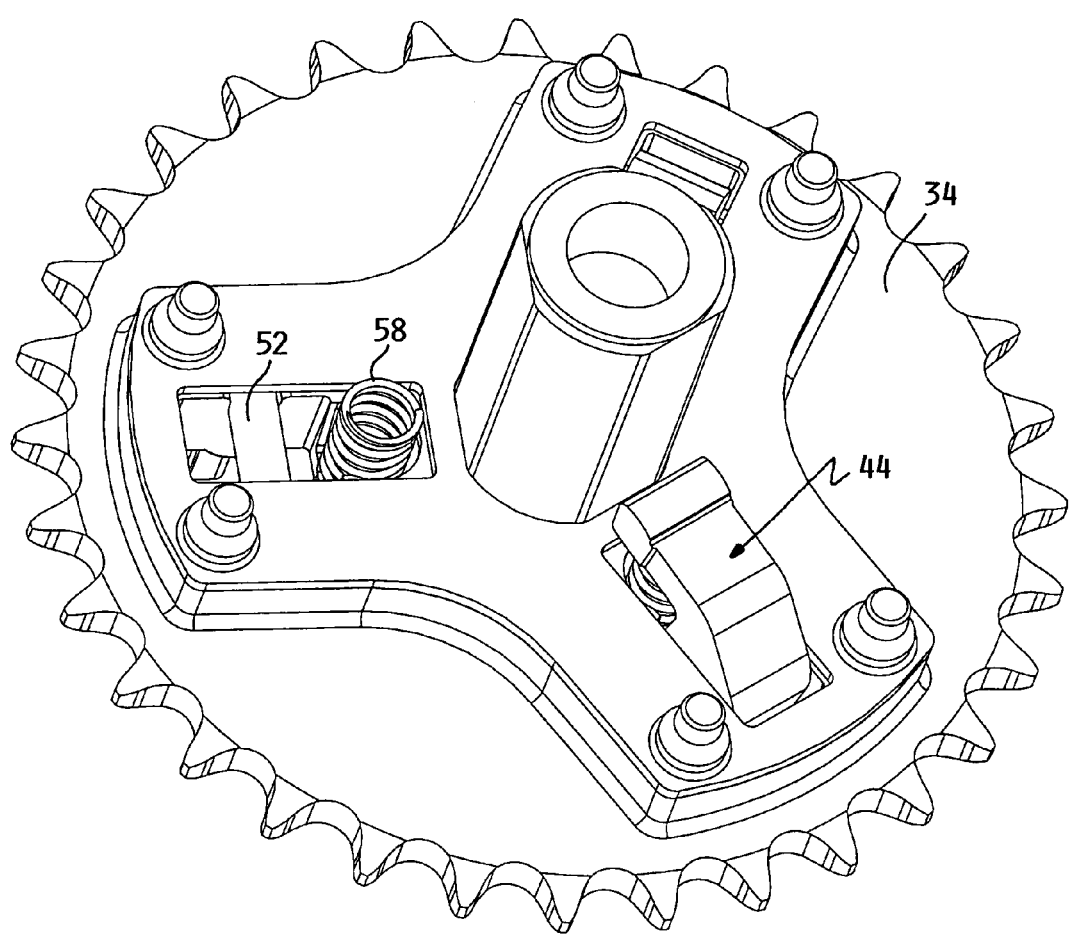
FIG. 4 is a perspective view similar to FIG. 3, particularly illustrating the drive sprocket with one of the drive pawls removed to show the pivot pin and biasing spring for the removed drive pawl.
Figure 5:
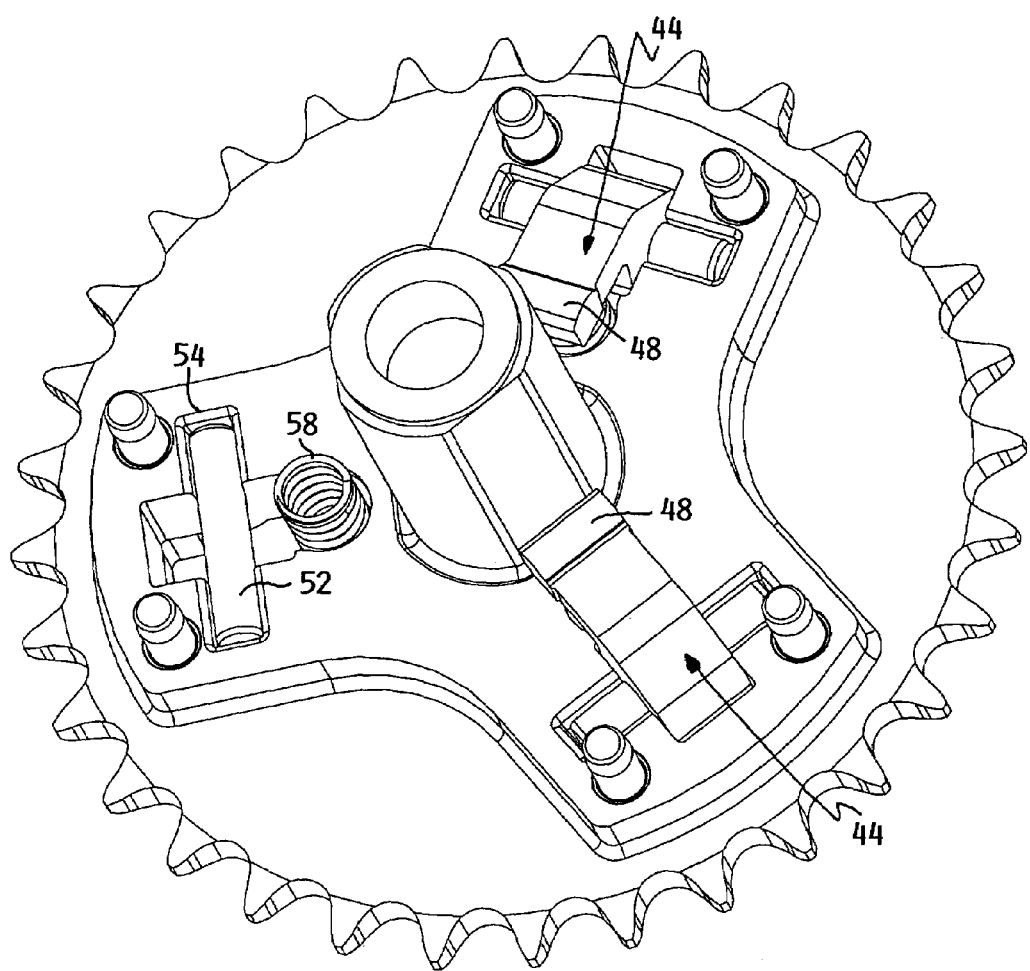
FIG. 5 is a perspective view similar to FIGS. 3 and 4, particularly illustrating the drive sprocket with one of the drive pawls removed and with a backing plate removed to show how the pivot pin is mounted in the drive sprocket.
Figure 6:
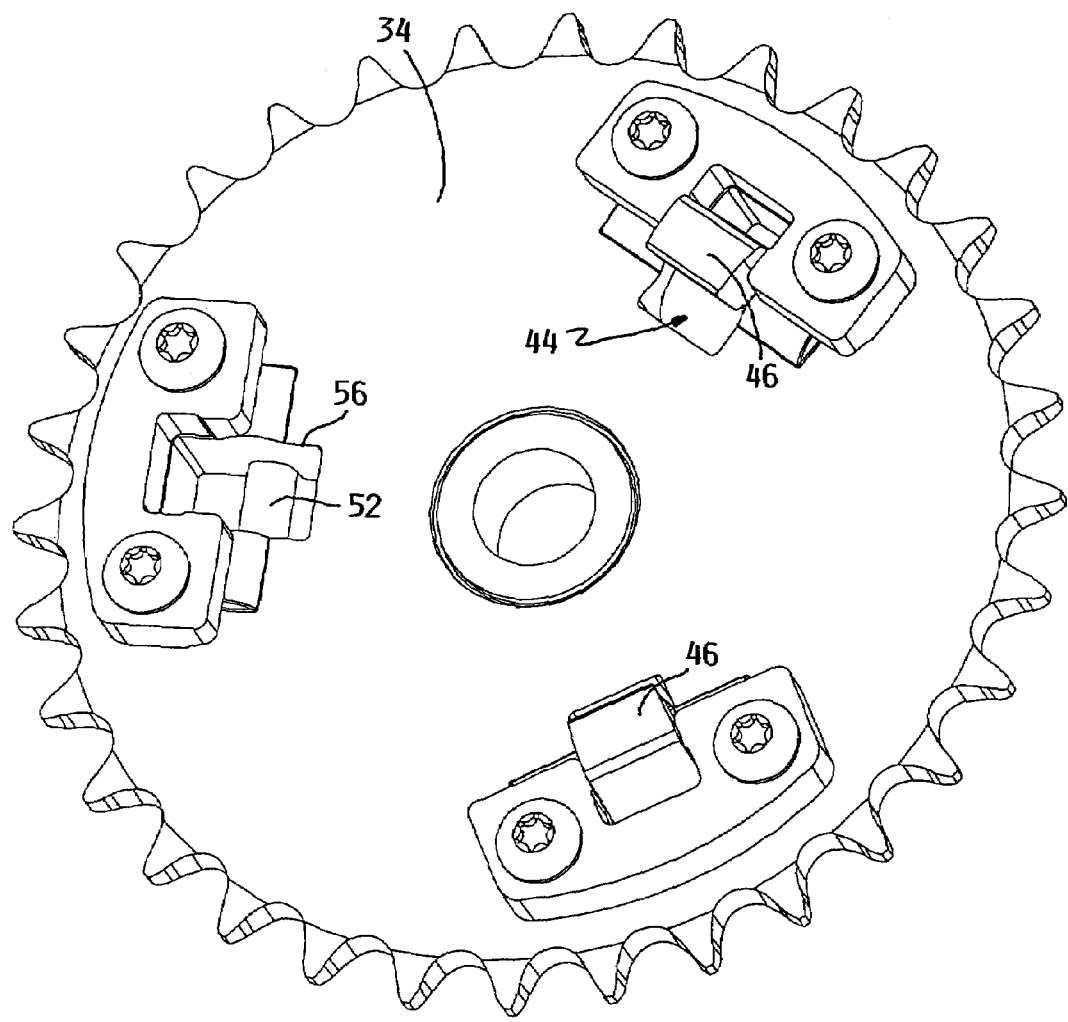
FIG. 6 is a perspective view similar to FIG. 4, but particularly illustrating the side of the drive sprocket that is opposite to the side of the drive sprocket illustrated in FIG. 4.

Each pawl 44 pivots about a longitudinal pivot pin 52 located in a recess 54 carried on an inner face of drive sprocket 34. See FIGS. 4 and 5. This mounting permits head 46 of pawl 44 to transversely project from the opposite outer face of drive sprocket 34 through an opening 56 in drive sprocket 34. See FIG. 6. A compression type biasing spring 58, shown most clearly in FIGS. 3 and 4, extends between drive sprocket 34 and the underside of tail 48 of pawl 44 to normally bias pawl 44 into an engaged, drive position. In the engaged, drive position, head 46 of pawl 44 has pivoted downwardly far enough to engage one of a plurality of circumferential notches 60 carried on the circumference of a ring 62 rotatably fixed to driven gear 36. See FIG. 9. There are as many notches 60 in ring 62 as there are pawls 44.

Figure 9:
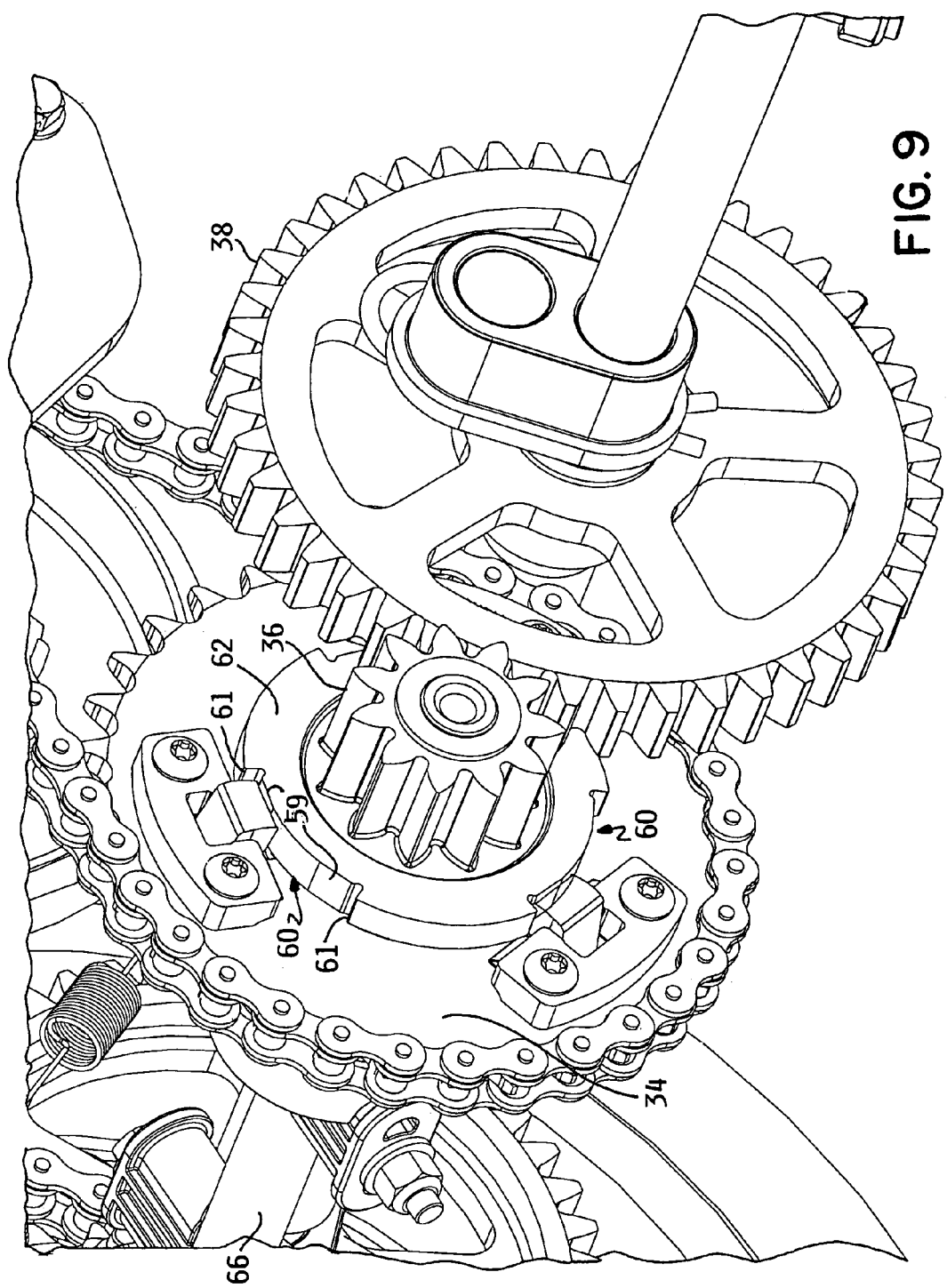
FIG. 9 is a perspective view of one of the wheel clutches shown in FIG. 2, particularly illustrating the right wheel clutch from the side of the drive sprocket opposite to the side illustrated in FIG. 8 with the drive pawls carried on the drive sprocket being disposed in an engaged, drive position in contact with the driven gear.

Referring further to FIG. 9, each notch 60 includes an end wall 61 at each side thereof and a flat 59 at the bottom of notch 60 adjacent each end wall 61. Head 46 of each pawl 44 has a bottom face 43 that engages against flat 59 and a driving surface 45 on each side thereof that abuts against end wall 61 of notch 60 when bottom face 43 is engaged with flat 59. There is a paired flat 59 and end wall 61 at each end of notch 60 and a pair of driving surfaces 45 on each side of pawl 44 to drive the driven gear 36 in both forward and reverse directions. FIG. 9 illustrates head 46 of each pawl 44 in engagement with flat 59 and end wall 61 at one end of notch 60 for driving snowthrower 2 in one direction, i.e. either the forward or reverse direction, depending upon the direction of rotation of input shaft 40. When input shaft 40 reverses direction to reverse the direction of motion, head 46 of each pawl will engage the corresponding flat 59 and end wall 61 at the other end of notch 60.

Each notch 60 in ring 62 is substantially longer than the width of head 46 of pawl 44 as shown in FIG. 9, namely the distance between end walls 61 of notch 60 is substantially longer than the distance between driving surfaces 45 on pawl head 46. This permits head 46 of pawl 44 to drop into a notch 60 more easily and smoothly since precise alignment between the two is not required. Often, a pawl 44 will already have head 46 thereof overlying some portion of notch 60 at the time pawl 44 is attempting to engage notch 60. Obviously, the engagement of the various pawls 44 carried by drive sprocket 34 with the circumferential, peripheral notches 60 carried by driven gear 36 establish a driving connection between drive sprocket 34 and driven gear 36. Torque is transferred through pawls 44 to driven gear 36 to rotate driven gear 36 with drive sprocket 34 when pawls 44 are engaged with notches 60.

Figure 11:
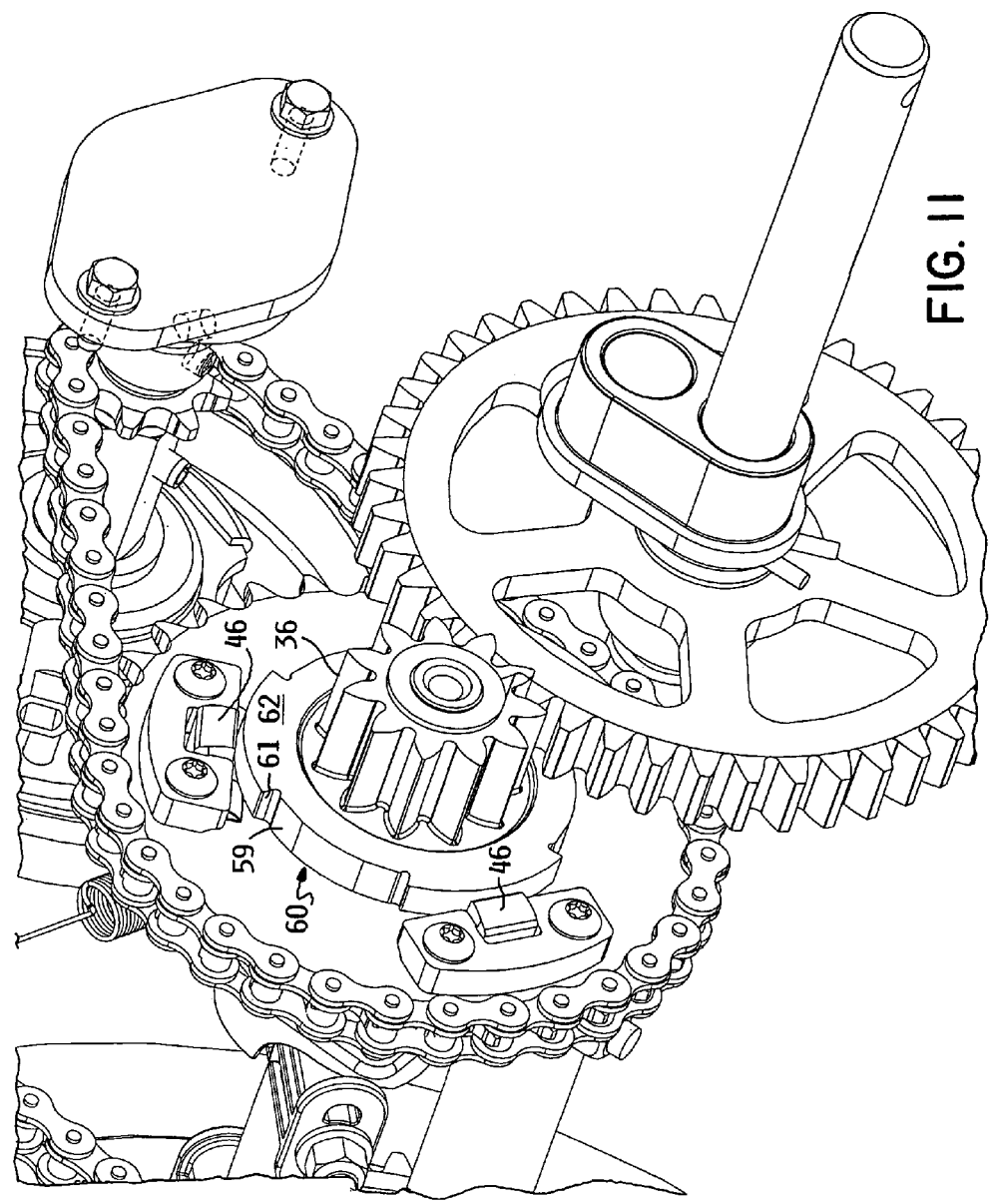
FIG. 11 is a perspective view similar to FIG. 9, particularly illustrating the drive pawls carried on the drive sprocket being disposed in a disengaged, non-drive position in which the drive pawls are out of contact with the driven gear.

The driving connection between drive sprocket 34 and driven gear 36 is broken by simultaneously pressing tails 48 of pawls 44 towards drive sprocket 34 to pivot pawls 44 against the bias provided by springs 58. This will cause head 46 of each pawl 44 to pivot upwardly until head 46 of pawl 44 is lifted up and out of each notch 60. With pawls 44 disposed in such a disengaged, non-driving position, no torque is transferred between drive sprocket 34 and driven gear 36 to interrupt the drive to drive wheel 12 driven by the drive train 22 containing the disengaged clutch 42. Such a disengaged, non-driving position is illustrated in FIG. 11.

Figure 8:
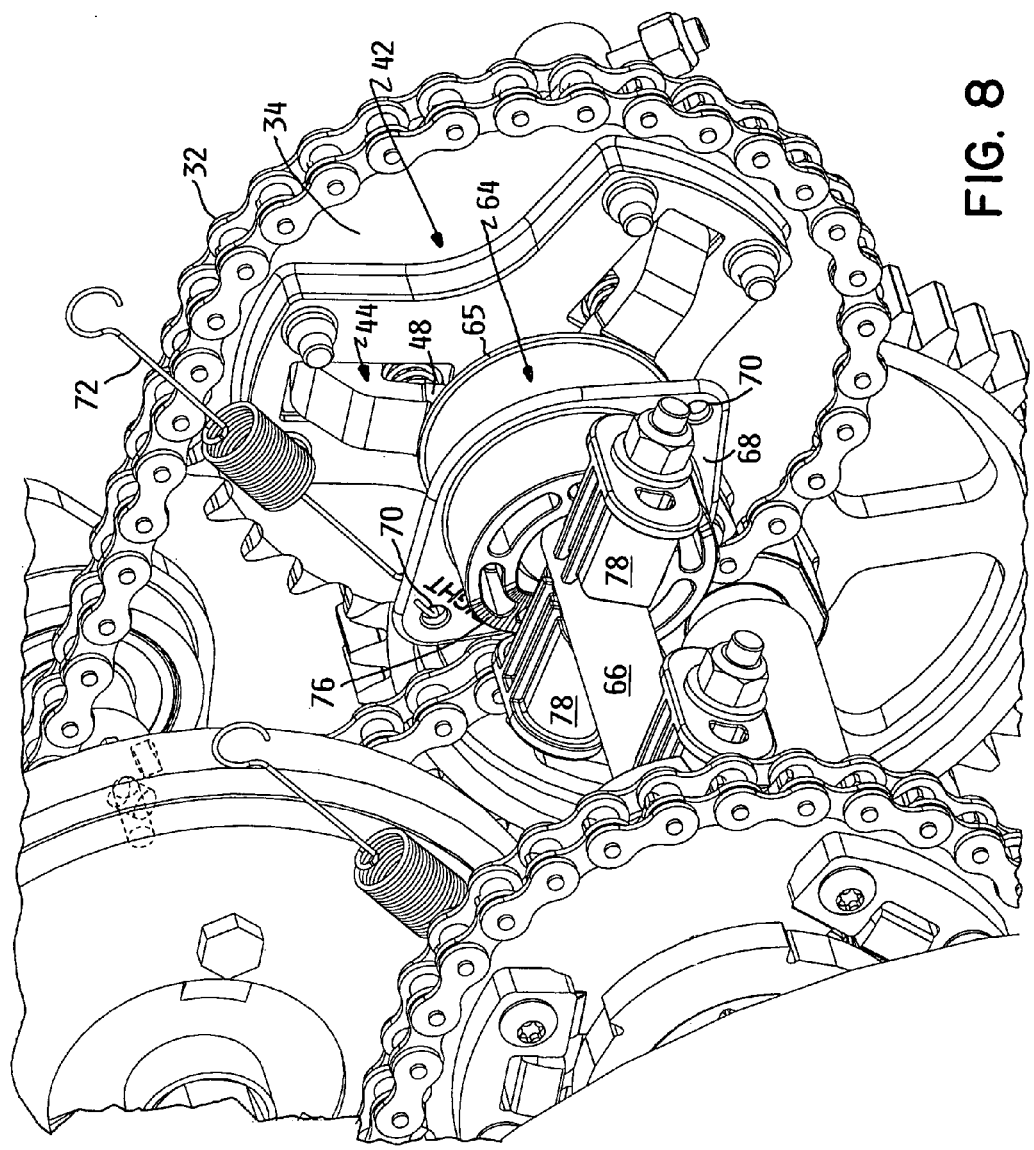
FIG. 8 is a perspective view of one of the wheel clutches shown in FIG. 2, particularly illustrating the right wheel clutch from one side of the drive sprocket with the drive pawls carried on the drive sprocket being disposed in an engaged, drive position.

Referring now to FIG. 8, a shift collar 64 is placed adjacent the inner face of drive sprocket 34 with shift collar 64 having an outer face that simultaneously abuts against the inwardly projecting tails 48 of pawls 44. An elongated support shaft 66 is fixed to the frame of snowthrower 2 and extends between opposite side walls on the frame of snowthrower 2. Shaft 66 rotatably carries both drive sprocket 34 and driven gear 36. A shift collar 64 is rotatably carried on the hub of drive sprocket 34.

Shift collar 64 includes a flange 68 having opposed holes 70 at either end. See FIG. 8. One hole 70 in flange 68 is hooked to a spring 72 that extends to some fixed portion of the frame of snowthrower 2. Spring 72 biases shift collar 64 to a non-actuated position in which it has not pressed inwardly on tails 48 of pawls 44. The other hole 70 in flange 68 in shift collar 64 is hooked to a linkage 74 extending upwardly to one of steering levers 28. See FIG. 12. When steering lever 28 is squeezed shut against the underside of handle 18, linkage 74 will pull on shift collar 64 to rotate shift collar 64 about the hub of drive sprocket 34 on which it is carried.

Figure 10:
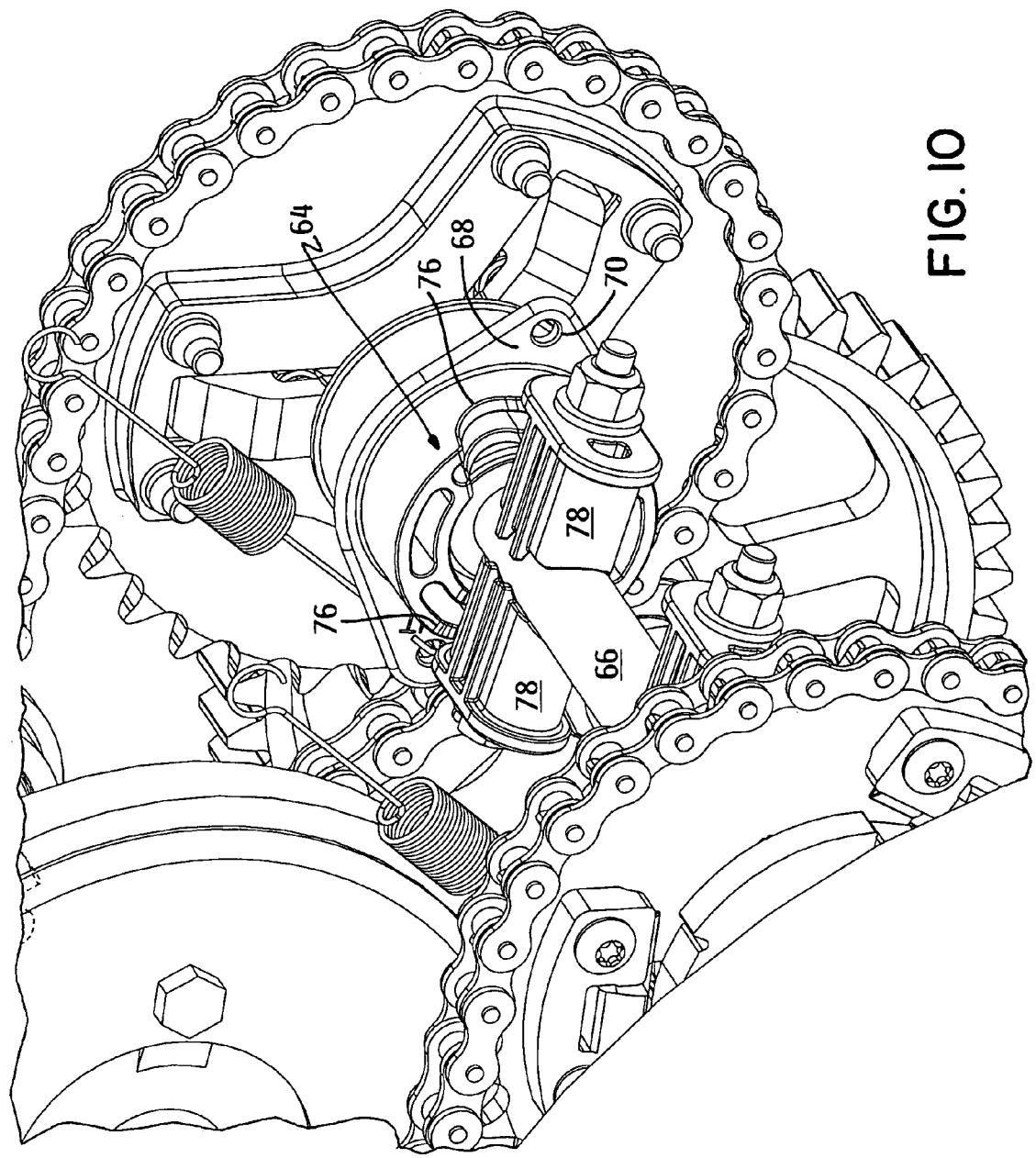
FIG. 10 is a perspective view similar to FIG. 8, particularly illustrating the drive pawls carried on the drive sprocket being disposed in a disengaged, non-drive position.

An inner face of shift collar 64 has a pair of ramped surfaces 76 thereon disposed diametrically opposite to one another. A portion of one such ramped surface 76 is shown in FIG. 8 and a portion of the other such ramped surface 76 is shown in FIG. 10. A pair of fixed cams 78 are carried on hollow shaft 66 adjacent and in contact with each ramped surface 76 on shift collar 64. Fixed cams 78 are bolted to opposite sides of hollow shaft 66 that carries shift collar 64. Each shift collar 64 includes a pair of ramped surfaces 76 so there are a corresponding pair of fixed cams 78 on each side of snowthrower 2 adjacent each shift collar 64. See FIG. 2.

Obviously, when each shift collar 64 is rotated about the axis of hollow shaft 66 by squeezing steering lever 28 on that side of snowthrower 2 closed, shift collar 64 will rotate relative to fixed cams 78. The interaction between the ramped surfaces 76 on shift collar 64 and fixed cams 78 will axially cam shift collar 64 outwardly towards drive sprocket 34. As this happens, the outer face of shift collar 64 will press inwardly on tails 48 of pawls 44 to simultaneously pivot heads 46 of pawls 44 upwardly until pawls 44 have disengaged notches 60 in ring 62 fixed to driven gear 36. As long as the operator keeps steering lever 28 squeezed shut in its closed position, shift collar 64 will remain axially shifted to disengage the corresponding clutch 42 and the drive to the corresponding drive wheel 12.

When the operator lets steering lever 28 go, the force of springs 58 acting on pawls 44 and spring 72 acting on shift collar 64 will return both steering lever 28 and shift collar 64 to their respective starting positions. Thus, ramped surfaces 76 on shift collar 64 will now slide in a reverse direction on the pair of fixed cams 78 to terminate pressing inwardly on tails 48 of pawls 44. The compression springs 58 acting on tails 48 of pawls 44 will also now cause pawls 44 to pivot in a direction that moves heads 46 of pawls 44 downwardly into engagement with notches 60 carried by driven gear 36. This reestablishes the driving connection between drive sprocket 34 and driven gear 36.

A couple of points about shift collar 64 are worth noting. First, when shift collar 64 is being returned to its starting position by springs 58 and 72, heads 46 of pawls 44 will bottom out in notches 60 before shift collar 74 is fully returned to its starting position. Shift collar 74 is returned the remaining distance to its starting position by the action of spring 72 alone. Thus, in its starting position, shift collar 74 is spaced slightly from tails 48 of pawls 44 to prevent tails 48 of pawls 44 from continuously rubbing on the outer face of shift collar 64. Since shift collar 64 and fixed cams 78 are desirably made of plastic or the like, the outer face of shift collar has a more durable (e.g. metallic) thrust plate or thrust washer 65 for engagement with tails 48 of pawls 44.

Secondly, when shift collar 64 is being axially cammed outwardly by fixed cams 78 to push on tails 48 of pawls 44 and thereby to pivot pawls 44, both drive sprocket 34 and driven gear 36 have to be axially retained on shaft 66. This is necessary to allow the force being applied by shift collar 64 to be applied to pawls 44 rather than simply laterally sliding drive sprocket 34 and driven gear 36 on shaft 66. Drive sprocket 34 and driven gear 36 can be axially retained on shaft 66, while remaining rotatable on shaft 66, in any suitable manner.

The manner in which wheel drive steering system 20 of this invention operates should now be apparent. When neither of steering levers 28 is closed, clutches 42 in both of drive trains 22 are engaged to transmit drive equally to each drive wheel 12. Accordingly, snowthrower 2 is propelled in a straight line by drive wheels 12.

If snowthrower 2 is travelling forwardly and the operator wishes to turn to the left, the operator need only squeeze steering lever $28_l$ on the left handle $18_l$ closed to disengage clutch 42 in the left drive train $22_l$. This will discontinue the driving force to the left drive wheel $12_l$. However, clutch 42 in the right drive train $22_r$ remains engaged and the right drive wheel 12 remains powered. Thus, snowthrower 2 will turn to the left. A turn to the right is accomplished similarly by closing the right steering lever $28_r$ instead of the left steering lever $28_l$.

Wheel drive steering system 20 of this invention utilizes simple drive trains 22 having a plurality of speed reduction stages between the input 40 and output shafts 24. In addition, the selectively operable clutch 42 in each drive train 22 is also built of simple and durable components which are not prone to failure. Pawls 44 are thick enough to be very rugged and durable under use. In addition, pawls 44 do not engage directly with the teeth of driven gear 36, but in wide, elongated notches 60 in a ring 62 that is attached to or is part of driven gear 36. This avoids stripping or damaging the teeth of driven gear 36.

In addition, pawls 44 are distributed around each drive sprocket 34 in an equally spaced manner at equal angular intervals. Shift collar 64 includes a pair of diametrically opposed ramped surfaces 76 that engage against a pair of fixed cams 78. Thus, the forces provided by shift collar 64 on pawls 44, and the distribution of pawls 44 on drive sprocket 34, are balanced and symmetrical. This results in smooth and reliable engagement and disengagement.

While wheel drive steering system 20 of this invention has been shown in conjunction with a two stage snowthrower, it is not limited for used with such a snowthrower. For example, it could be used on a single stage snowthrower to provide steering control if such snowthrower is propelled by a pair of drive wheels.

Various other modifications of this invention will be apparent to those skilled in the art. Accordingly, this invention is to be limited only by the appended claims.

We claim:

1. An improved snowthrower which is propelled by a pair of ground engaging drive members comprising a left ground engaging drive member and a right ground engaging drive member powered by a power source, the snowthrower having an upwardly and rearwardly extending handle assembly to allow a walking operator to guide and control the snowthrower, wherein the improvement relates to a steering system for the snowthrower which comprises:
   (a) independent left and right drive trains for independently driving the left and right ground engaging drive members, respectively, from the power source, wherein each drive train comprises:
   (i) a drive member rotatable about an axis of rotation;
   (ii) a driven member rotatable about the axis of rotation;
   (iii) a clutch having at least one pivotal pawl with the clutch configured to transmit torque from the drive member to the driven member directly through the pawl to transfer a driving force to one of the ground engaging drive members; and
   (iv) an axially movable shift member for pivoting the pawl as the shift member is moved axially along the axis of rotation; and
   (b) left and right steering controls carried on the handle assembly of the snowthrower and connected, respectively, to the clutches in the left and right drive trains to selectively disengage a ground engaging drive member on one side of the snowthrower to steer the snowthrower toward the one side of the snowthrower having the disengaged ground engaging drive member.

2. The snowthrower of claim 1, wherein the clutch has a plurality of circumferentially spaced pivotal pawls for transmitting torque from the drive member to the driven member.

3. The snowthrower of claim 2, wherein the pivotal pawls are circumferentially spaced apart at substantially equal angular intervals relative to one another.

4. The snowthrower of claim 1, wherein the drive member comprises a toothed drive member and the driven member comprises a toothed driven member.

5. The snowthrower of claim 1, wherein the pivotal pawl is pivotally carried on the drive member, and wherein the pivotal pawl has a head that projects outwardly from one face of the drive member and moves vertically up and down as the pawl pivots.

6. The snowthrower of claim 5, wherein the head is received in an elongated notch carried on the driven member.

7. The snowthrower of claim 6, wherein the elongated notch has a length that is substantially longer than a width of the head of the pawl.

8. The snowthrower of claim 6, wherein the driven member comprises a toothed driven gear, and wherein the elongated notch is carried on an outer circumference of a ring that is fixed to the driven gear such that the pawl does not directly engage the teeth of the driven gear.

9. The snowthrower of claim 6, wherein a plurality of circumferentially spaced pawls on the drive member engage in a plurality of circumferentially spaced notches on the driven member.

10. The snowthrower of claim 5, wherein the pawl is spring biased relative to the drive member to vertically move the head of the pawl in a direction towards engagement with the driven member.

11. The snowthrower of claim 5, wherein the axially movable shift member is mounted adjacent the drive member for pivoting the pawl as the shift member is moved axially along the axis of rotation towards the drive member.

12. The snowthrower of claim 11, wherein the shift member presses against a tail of the pawl, the tail of the pawl and the head of the pawl being disposed on opposite sides of a pivot axis of the pawl.

13. The snowthrower of claim 12, further including a spring acting on the tail of the pawl to bias the head of the pawl in a direction that would cause the head of the pawl to engage with the driven member.

14. The snowthrower of claim 13, wherein the shift member when moved axially towards the drive member presses in on the tail of the pawl to compress the spring and pivot the pawl to cause the head of the pawl to disengage the driven member.

15. The snowthrower of claim 14, wherein the shift member is connected by a linkage to one of the steering controls to be axially shifted when the one steering control is closed.

16. The snowthrower of claim 11, wherein the shift member is rotatably mounted on the snowthrower and is axially shifted by a cam that axially cams the shift member towards the drive member when the shift member is rotated.

17. The snowthrower of claim 16, wherein the shift member is axially cammed by a pair of cams acting on diametrically opposite portions of one face of the shift member.

18. The snowthrower of claim 1, wherein the pair of ground engaging drive members comprises a pair of rotatable drive wheels.

19. A snowthrower, which comprises:
a frame propelled by a pair of ground engaging drive members comprising a left ground engaging drive member and a right ground engaging drive member;
a rotatable snowthrowing member carried on the frame; and
a steering system that includes a pair of clutches for independently driving the ground engaging drive members, wherein each clutch comprises:
(a) a drive member that rotates about a rotational axis;
(b) a driven member;
(c) at least one pawl carried on the drive member for operatively connecting the drive member to the driven member for rotation therewith in an engaged, drive position of the clutch, wherein the pawl pivots on a pivot axis carried on the drive member;
(d) a spring on the drive member acting on the pawl for pivoting the pawl in a first direction about the pivot axis; and
(e) an axially movable shift member on the frame of the snowthrower, wherein the axially movable shift member acts on the pawl for pivoting the pawl against the bias of the spring in a second opposed direction about the pivot axis, and wherein the shift member is a shift collar that axially moves towards and away from the drive member along the rotational axis of the drive member.

20. The snowthrower of claim 19, wherein the first direction of pivoting of the pawl is a direction which causes the pawl to engage with the driven member so that the clutch is normally disposed in the engaged, drive position thereof, and wherein the second direction of pivoting of the pawl is a direction which causes the pawl to disengage the driven member so that the clutch is disposed in a disengaged, non-drive position only when the axially movable shift member has been axially moved on the frame of the snowthrower relative to the drive member.

21. The snowthrower of claim 19, wherein the drive member pivotally carries a plurality of pawls thereon, and wherein the shift collar acts on all the pawls simultaneously to pivot the pawls in the opposed second direction.

22. The snowthrower of claim 19, wherein the shift member is mounted for rotation about the rotational axis of the drive member and is axially moved by a cam on the frame of the drive member that axially cams the shift member towards the drive member when the shift member is rotated.

23. The snowthrower of claim 19, wherein the drive member comprises a toothed drive gear and the driven member comprises a toothed driven gear.

24. A snowthrower, which comprises:
(a) a frame propelled by a pair of ground engaging drive members comprising a left ground engaging drive member and a right ground engaging drive member;
(b) a rotatable snowthrowing member carried on the frame; and
(c) a steering system that includes a pair of clutches for independently driving the ground engaging drive members, wherein each clutch comprises:
(i) a toothed drive member that rotates about a rotational axis;
(ii) a toothed driven member that rotates about the rotational axis;
(iii) a plurality of pivotal pawls carried on the drive member, each pawl having a head and a tail on opposite sides of a pivot for each pawl with the heads of the pawls projecting from one face of the drive member to move towards or away from the driven member for engagement and disengagement with the driven member, respectively, the tails of the pawls being disposed on an opposite face of the drive member; and
(iv) a shift member that moves axially along the rotational axis towards the opposite face of the drive member to simultaneously press inwardly on the tails of the pawls to pivot all the pawls on the drive member, the shift member being under the selective control of an operator of the snowthrower.

25. The snowthrower of claim 24, wherein the pivotal pawls are circumferentially spaced apart on the drive member at substantially equal angular intervals relative to one another.

26. The snowthrower of claim 25, wherein the shift member is rotatably mounted on the rotational axis, and further including a cam arrangement between the shift member and the frame of the snowthrower for converting rotary movement of the shift member about the rotational axis to axial motion of the shift member along the rotational axis.

27. The snowthrower of claim 26, wherein the cam arrangement includes a pair of diametrically opposite ramped surfaces on the shift member and a pair of fixed cams on the frame of the snowthrower acting against the ramped surfaces on the shift member.

28. An improved snowthrower having independent drive trains, wherein each drive train includes a rotatable drive member, a rotatable driven member, and an independently operable clutch between the drive and driven members, wherein steering is accomplished by leaving one drive train engaged while unclutching the other drive train to disengage the other drive train with the snowthrower turning towards the disengaged drive train side, wherein the improvement relates to the clutch in each drive train, which comprises:
(a) a plurality of pivotal pawls carried on the drive member, wherein the pawls have heads that are exposed by being laterally projected out of one side face of the drive member, wherein the one side face from which the pawls are laterally projected is a face that is substantially perpendicular to an axis of rotation of the drive member, and wherein the heads of the pawls when so exposed engage and disengage notches on the driven member to clutch or unclutch the drive and driven members, respectively.

29. The snowthrower of claim 28, wherein the pawls have tails that are exposed by being laterally projected out of an opposite side face of the drive member when the heads of the pawls are laterally projected out of the one side face of the drive member, and further including a shift member that is selectively movable axially by an operator to press on the tails of the pawls to disengage the heads of the pawls from the notches.

* * * * *